Aug. 15, 1961  R. G. GIDLOW ET AL  2,995,773
PROCESS AND APPARATUS FOR AGGLOMERATING PULVERULENT MATERIALS
Original Filed Sept. 2, 1958  2 Sheets-Sheet 1
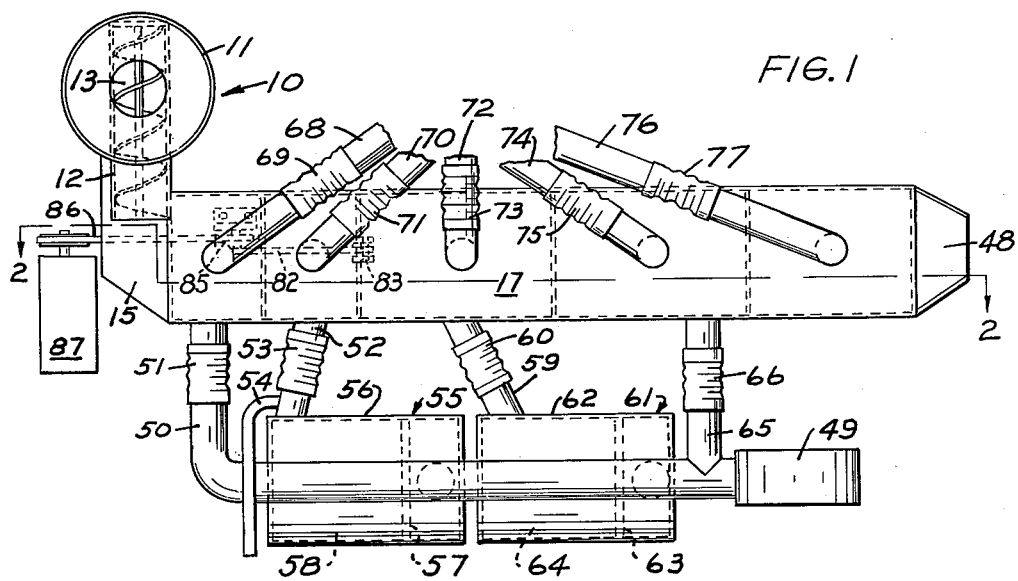
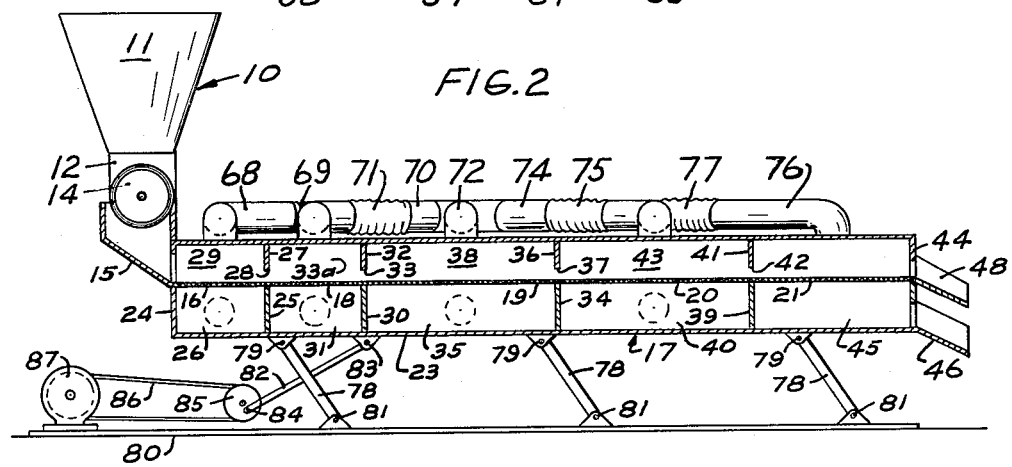
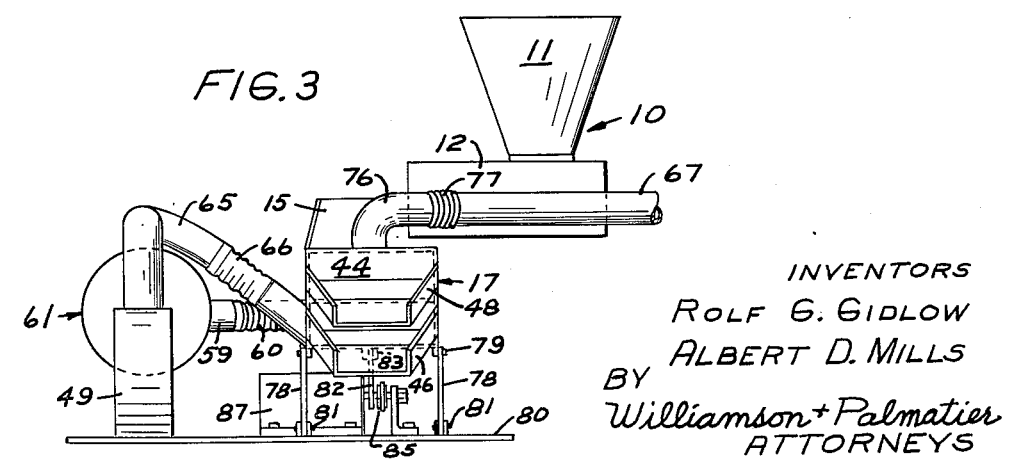
INVENTORS
ROLF G. GIDLOW
ALBERT D. MILLS
BY
Williamson + Palmatier
ATTORNEYS

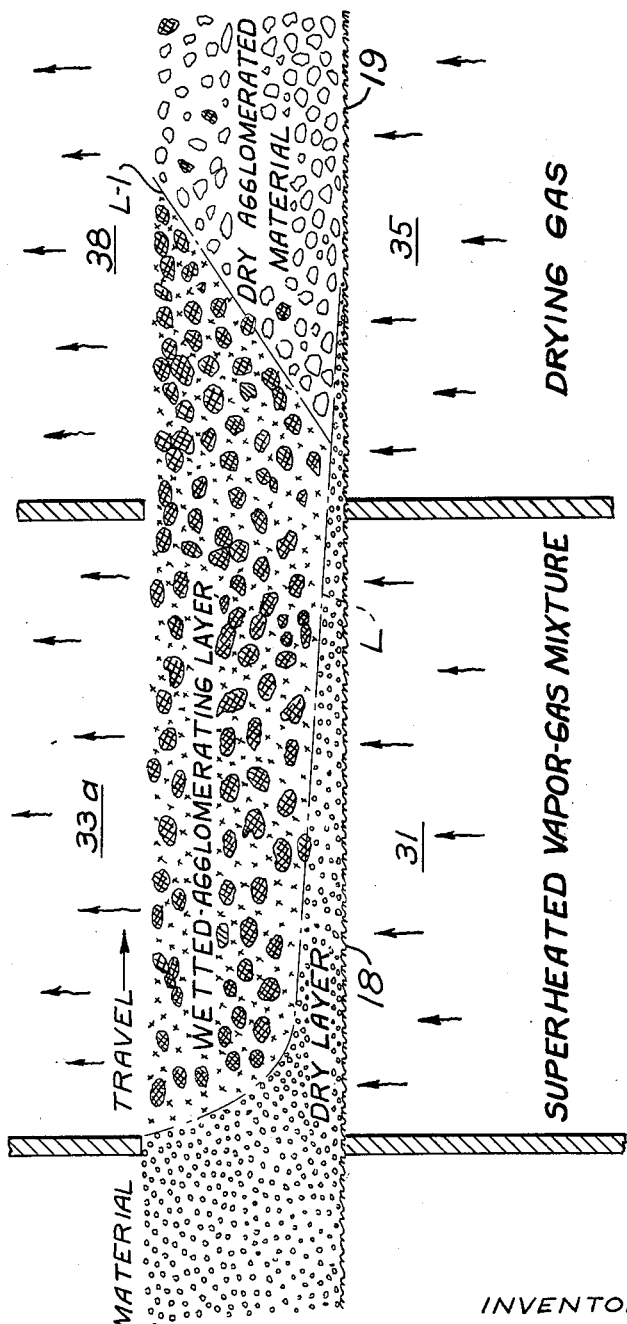

United States Patent Office 2,995,773
Patented Aug. 15, 1961

2,995,773
PROCESS AND APPARATUS FOR AGGLOMERATING PULVERULENT MATERIALS
Rolf G. Gidlow, North St. Paul, and Albert D. Mills, Minneapolis, Minn., assignors to The Pillsbury Company, Minneapolis, Minn., a corporation of Delaware
Continuation of application Ser. No. 758,381, Sept. 2, 1958. This application Sept. 26, 1960, Ser. No. 58,322
27 Claims. (Cl. 18—1)

This invention relates to the art of agglomerating pulverulent materials and more particularly to both a process and a machine for capacity production of readily soluble or dispersible agglomerates, and is a continuation of our co-pending application S.N. 758,381, filed September 2, 1958, now abandoned.

Agglomeration broadly defined consists in the formation of clusters of very small individual particles by producing adhesive films on the surfaces of the individual particles and then uniting multiplicities of the same to form a lacy network. The lacy network thereby produced defines voids or interstices between the original particles thereby causing very rapid permeation and absorption of water or other liquids and consequently rendering the product readily soluble or dispersible.

Regardless of the end objectives, the behavior of the particular powdered material during agglomeration procedure varies substantially. As a consequence the type of equipment and the process steps employed for agglomerating the numerous types of pulverulent material become important in relation to the adhesive, the melting point and other qualities of the particular material.

In agglomerating a number of powdered materials, addition of small quantities of adhesive substances is often useful. However, many pulverulent materials, including a number of food-ingredients used in packaged mixes and including many powdered chemicals, inherently develop adequate surface adhesiveness for the production of agglomerates thereof when subjected to moisture or surface condensation of vapors. Collision or surface contact of the adhesive particles and subsequent hardening of the adhesive substances are of course requisite in the formation of clusters or agglomerates.

The prior art processes as well as the physical equipment and machines have limitations and disadvantages in the production of agglomerates from many of the available pulverulent materials and particularly in the case of materials possessing inherent adhesive characteristics. In general, the present conventional and prior art methods and apparatus for agglomerating powdered material fall into two classes, to wit:

(1) Methods and apparatus which subject the powdered material during rapid mechanical agitation thereof to steam or very humid air. Revolving beater arms or equivalent mechanical agitators are generally employed with means for distributing the moistening medium on all of the solid particles in agitated and dispersed state; and (2) Methods and apparatus which atomize the pulverulent material into an enveloping atmosphere of steam of humid air.

In the operation of both classes of said prior art, the total quantity of solids introduced and initially formed into agglomerates becomes sticky and the particles strike against or engage walls, passages, moving parts (class 1) and other components of the apparatus before the adhesive substances are dried, thereby fouling the apparatus and producing undesirable incrustations on parts thereof. Such fouling is greatly accentuated where the powdered material is inherently sticky.

In actual practice of prior art methods and apparatus it is found that the space requirement for production of a commercially desirable capacity of agglomerates is extremely large in comparison with that required for carrying out our improved processes. The prior art processes are further objectionable because of unduly high power requirements and comparatively low thermal efficiencies.

We are concerned therefore with the production at high capacity of agglomerates from numerous pulverulent materials carried out in minimum space requirements and with the elimination of fouling and the forming of incrustations on the walls and working parts of the apparatus.

It is a general object to provide a relatively inexpensive and highly efficient process and apparatus for agglomerating pulverulent materials of manifold characteristics and compositions which will eliminate the said shortcomings of the prior art processes and apparatus.

More specifically it is an object of our invention to provide a novel process and apparatus which in operation combine a novel air suspension and stratification-treatment of the solid particles with preferably rapid agitation and flow thereof to efficiently and at high capacity agglomerate a very wide variety of pulverulent materials.

A further object is the provision of machinery or equipment of the class described which in operation will eliminate fouling of equipment and accumulation of incrustations and which will operate at high capacity and efficiency with low power and space requirements.

Another object is the provision of process and apparatus for efficiently agglomerating various pulverulent materials which produce a predetermined flow and travel of a substantially fluidized bed of the said material and then successively treat the particles in said moving bed with condensing vapor fluid and then with a drying fluid medium during dispersion, agitation and contact or collision of the individual particles while isolating the particles having surface condensation thereon from the essential mechanical components of the apparatus to prevent fouling and incrustation.

A further and more specific object is the efficient production of agglomerates of the class described by the general medium of process steps and apparatus components to set up a moving fluidized bed of the powdered material and successively treat that bed during movement and travel thereof first by flow or injection through said bed of a superheated vapor, usually admixed with a substantially non-condensable carrying gas, directed transversely of the travel of the bed and preferably through the full width thereof at a temperature originally above the dew point of the vapor to thereby heat the first-encountered or inner zone of the moving particles and in so doing to reduce the vapor temperature to its dew point and subsequently thereto to deposit vapor condensate upon the surfaces of the moving particles in the outer zone of the bed; and thereafter in the travel of the said bed to flow or inject into an area of travel adjacent to the first mentioned area a drying fluid for permeating the thickness of the bed and thereby drying the adhesive substances previously formed and rigidifying the agglomerates produced through contacting and colliding particles.

Essentially in our improved process or method the powdered material, at a controlled feed rate, is caused to flow over a permeable medium at the bottom of treatment chambers. A superheated solvent vapor or vapor gas mixture is passed upwardly through the permeable medium and through the powdered material, agitating, suspending and at least partially fluidizing the solid particles during flow movement thereof in a general pattern or path of travel extending transversely to the upward flow of superheated vapor. The lower zone or stratum of the material absorbs the heat from the vapor or vapor gas until, in the upper strata or zone of the moving solid particles, the temperature is lowered to the dew or condensation point of the vapor. Thus, condensation of the solvent vapor on the individual surfaces of the particles occurs at some distance above the porous medium and, at that point, the wetted particles are separated from the porous medium by a layer of dry heated particles. The thickness of such layer may be controlled by the amount of superheat in the vapor. The turbulence created by the fluidizing action of the vapor-gas in many cases supplemented by the flow characteristics and factors of the method steps and apparatus produces rapid collision and contact of the particles and, in the upper zone of the flowing material, causes the particles to become bonded together ultimately forming clusters or agglomerates. Thereafter, in travel the agglomerates are subjected to a dry gas to evaporate or otherwise solidify the adhesive surface substances.

These and other objects and advantages of the invention will more fully appear from the following description made in connection with the accompanying drawings wherein like reference characters refer to the same parts throughout the several views and in which an exemplary form of agglomerating apparatus, well suited to carry out our improved process commercially and at high capacity, is illustrated in the drawings and in which:

FIG. 1 is a top plan view of a novel apparatus, particularly adapted for carrying out our novel process, certain hidden portions thereof being shown in dotted line and diagramatically illustrated;

FIG. 2 is a vertical section taken on the line 2—2 of FIG. 1;

FIG. 3 is a front elevation of the apparatus, certain portions thereof unnecessary to the invention being cut away; and FIG. 4 is a diagrammatical fragmentary vertical section taken longitudinally of the flow of material illustrating important steps in our process of agglomeration.

With continued reference to the drawings, our apparatus for agglomerating pulverulent products has a feed mechanism indicated generally at 10 which, in turn, has a hopper 11 communicating with a screw conveyor housing 12, which in turn, contains a screw conveyor 13 adapted to feed and advance the powdered or pulverulent material 14 to a feed spout 15, as shown in FIGS. 1 and 2. The screw conveyor 13 is illustrated diagrammatically and may be journaled and rotatably driven in conventional manner by means not shown.

The dry material is delivered from the feed spout 15 to a pervious sheet 16 which may be constructed of glass cloth or similar material having a fine mesh size of from 60 to 400 filaments per linear inch capable of permitting vapor and gas to pass upwardly therethrough and exert a "fluidizing effect upon powdered material" 14 which is continuously deposited thereon. The sheet 16 is substantially planar in construction so that the material will not tend to collect at one portion thereof or to become channeled in a particular area in the course of travel of the particles along the sheet 16. Sheet 16 is disposed across a housing frame 17 which may also provide the various chambers for pressurized fluid and for exhausting fluid, as will hereinafter more fully be explained.

As the pulverulent material leaves the screen area 16, it continues upon another sheet or screen 18 which is also of substantially planar construction and disposed at a relative position not higher than a co-planar relationship with the first mentioned screen area. Feed material passing from the screen area 16 thus continues along the screen or sheet 18 for treatment, as will be presently described.

As the material leaves the sheet 18, it passes to the pervious sheet 19 which is disposed at a position not higher than a co-planar relationship with the sheet 18. In the same manner, the material may pass to the next pervious sheet 20 and finally to a sheet or screen 21 which may be of different character than the previous sheets for the purpose of classifying the agglomerated product, retaining a portion thereof upon the surface of screen 21 and permitting undersized agglomerates to pass through the screen and be collected independently thereof. All of the sheets or screens 16, 18, 19, 20 and 21 are mounted within the housing frame 17, the latter being an enclosure and having the screen members co-extend for the full width thereof, as shown in FIGS. 1 and 2. We have found it practical to utilize a glass cloth or web in a continuous plane to supply the various sheet areas, as described above.

It will be noted that all of the pervious sheets are so located with respect to the top 22 and the bottom 23 of the housing frame 17 that spaced areas exist below and above the screens within the housing frame 17. Upstanding partitions are employed to subdivide the spaces into chambers which will be more fully described below. Thus, the pervious sheet 16 is mounted at the feed end 24 of the housing frame 17 and partition 25 across the housing frame 17 defines an enclosed chamber 26 immediately below the pervious sheet 16. A corresponding upper baffle 27 extends across the housing frame 17 but terminates downwardly in an edge 28 which lies in clearance with the sheet 16 so as to permit pulverulent material to pass thereunder in the course of its treatment. A chamber 29 is created immediately above the pervious screen 16, as shown in FIG. 2.

In a similar manner, an upright partition 30 is disposed across the housing frame 17 beneath the pervious sheet 18 to establish an enclosed chamber 31 thereunder. Baffle 32 is disposed across the housing frame 17 and has a downwardly terminating edge 33 which will permit material 14 to pass thereunder to the next pervious sheet 19.

Another upstanding partition 34 defines, with the housing frame 17 and the pervious sheet 19, a chamber 35 immediately below the pervious sheet 19. Baffle 36 having a downwardly terminating edge 37 defines a chamber 38 overlying pervious sheet 19.

A still further partition 39 disposed across the housing frame 17 defines a chamber 40 immediately beneath the pervious sheet 20 and a baffle 41 having a downwardly disposed edge 42 defines a chamber 43 immediately above the pervious sheet 20. At the discharge end of the housing frame 17 is end wall 44 which, with the screen 21 and the partition 39, defines a chamber 45 and a delivery spout 46 communicates at the discharge end of the device with the same chamber 45. Immediately above the classifying screen 21 is the chamber 47 which communicates with discharge spout 48 for delivering agglomerated material of a size which will not pass through the screen 21.

All of the aforementioned screens and corresponding upper and lower chambers are arranged sequentially to accommodate the pulverulent and granular material 14 and effect a sequential treatment thereof from its introduction by feed spout 15 until its discharge from the spouts 46 and 48.

The following description is concerned with certain applications of our process and apparatus where humid, heated air or other mixtures are employed as the vapor gas. Use of other vapors and gases for certain pulverulent materials does not in many instances require the same pre-treatment of the vapor or gaseous medium nor the subsequent steps of drying and cooling.

By reference to FIG. 1, it is seen that each of the chambers underlying a pervious sheet is adapted to receive pressurized air or other fluidizing gas or gas-vapor mixtures and to effect a desired treatment of that portion of the solid material which then overlies its associated pervious sheet or screen. In the treatment of various pulverulent materials, air at room temperature may be supplied for the entire fluid treatment from a main conduit 49. Pressure may be supplied by a fan or other means (not shown). A branch conduit 50 containing a flexible joint 51 communicates wtih the chamber 26 and, in the application now described, supplies air at room temperature thereto. This chamber 26 and the associated pervious screen 16 are adapted to preliminarily fluidize and/or suspend the pulverulent material 14 as it is received and fed from the hopper mechanism 11.

A conduit 52 having a flexible joint 53 supplies air (or other fluidizing gas mixtures) from the main conduit 49 to chamber 31 underlying the pervious screen 18. This screen with the chamber 31 provides means for the upwardly moving stream of vapor-condensing fluid medium in superheated condition to pass upwardly through the pulverulent material above screen 18 for agglomerating the minute solid particles.

In the application and apparatus now described, a vapor line 54 (which vapor may be steam) introduces solvent vapor in predescribed proportion into the gaseous carrier medium such as air passing through conduit 52. In many instances the superheated vapor or steam is not adequate for heating the gas or fluid carrier means to proper superheated temperature so ordinarily a heater element 55 is interposed between the main conduit 49 and the conduit 52 as shown in FIG. 1. Heater 55 may comprise an enclosed housing 56 containing a filter 57 and conventional heating elements 58 which may be controlled by the usual means (not shown). The heated vapor gas mixture is delivered to conduit 52 into the lower chamber 31 and permeates screen 18 passing upwardly and uniformly into the treating chamber 33a.

It is important in the carrying out of our process that the temperature of the vapor gas mixture flowing through screen 18 be maintained at a point considerably above the dew point of the vapor-gas admixture so that the fluidized solid particles in the lower zone or strata of the material above screen 18 will absorb the superheat and remain dry without production of condensation upon particle surfaces until contact of the impinging, upwardly flowing vapor-gas mixture is made upon surfaces of the upper zone or strata of the flow of particles above screen 18.

The next chamber 35 of the apparatus provides a drying gas also flowing upwardly through the pervious sheet 19 into the drying chamber 38 above. The drying gas such as air may be heated and, as shown, conduit 59 which communicates through flexible joint 60 with the chamber 35 may have interposed therein a heater 61 having a housing 62, a filter 63 and a controlled heating element 64.

The next chamber 40 which underlies the pervious sheet 20 is provided as shown with a cooling gas such as air through conduit 65 and flexible coupling 66. Conduit 65 in turn, connects with the main supply conduit 49 and delivers to chamber 40 which underlies the cooling treatment chamber 43.

Since the final classifying screen 21 (used in some applications of our process and apparatus) is not utilized for fluid treatment of the agglomerates, no fluid supply line is employed in chamber 45 which constitutes a collection chamber for the finer output product.

Since the character of the gas such as air in each of the aforementioned chambers should be maintained distinct as between the pervious sheet members and the treatment chambers defined thereabove to facilitate reuse of each separate gas quantity by total or partial recirculation, we provide exhaust means to immediately take off the pressurized fluid which is passed through the flow of fluidized material in the individual treatment chambers 29, 33a, 38 and 43. We accomplish this simply through separate exhaust conduits which in turn may communicate with dust collectors and fan (not shown), to wit:

Line 68 and its flexible coupling 69 communicate through the top wall 22 of the housing with the fluidizing chamber 29. Line 70 and its flexible coupling 71 communicate with the top of chamber 33a to remove the gas-vapor mixture after its agglomerating action upon the material 14. Line 72 and its flexible coupling 73 provide an exhaust for chamber 38 to remove the warm vapor gas and hot gas which have picked up solvent vapor from the agglomerated product during the drying step. Line 74 communicates with chamber 43 to exhaust gas therefrom after it has exerted a chilling and further drying influence upon the warm agglomerates. The last line 76 and its flexible coupling 77 exhaust the gas from the top of the classifying chamber or machine 47 to remove any dust produced in the screening operation.

An important feature of the invention resides in the continual agitation of preferably all of the pervious sheets and chambers to keep the individual powdered particles as well as the agglomerates in continually dispersed and fluidized condition. The combined agitation of the pervious sheets together with the upward flow of the various pressurized gas and vapor-gas streams effects proper treatment of the powder and the agglomerates while in highly concentrated and fluidized bed and contributes to maintain the entire machine in non-fouling condition. The mechanism as shown for effecting the rapid vibration comprises supporting struts 78 pivotally secured to the bottom 23 of the housing frame 17 at respective points 79 and comprises also a fixed supporting base 80 to which the lower ends of said struts are pivoted at points 81 (see FIG. 2). The several struts 78 are disposed in parallel relationship and may be angulated as shown at the forward end of the vibration or agitation stroke so that upward swinging of the struts produces a forward movement of the entire housing frame including the pervious sheets and chamber-defining vertical partitions mounted therein. Rapid vibration is imparted through the struts 78 by suitable means such as a reciprocating arm or pitman 82 which may be pivotally secured at one end 83 to one of the arms 78 or, as shown, to the bottom 23 of the housing frame 17. The opposite end of the arm 82 is secured pivotally at a point 84 to an eccentric wheel 85 which is journaled with respect to base 80 and which is driven through a belt 86 by a source of rotary power such as a motor 87.

The preferred operation of our process and apparatus requires for the production of adhesive films the controlled passage of a superheated vapor or "gaseous mixture" containing a superheated vapor (hereinafter referred to as "vapor-gas"), upwardly through the permeable supporting medium or screen 18 of the apparatus, said vapor-gas containing:

(1) Gas, which in this specification and the appended claims, means an essentially inert gas which serves as a carrier for the agglomerating vapor and which transfers heat to the solids being treated and preferably provides the force necessary to fluidize or sufficiently agitate the bed of solids so as to cause the solid particles to be partially suspended and dispersed in the bed. The requisite gas in most cases is not condensable within the range of temperatures employed and is inert toward the material being treated.

(2) Vapor, which is either condensable or absorbable on the surfaces of the particles being agglomerated within the range of temperatures employed and, when so condensed and/or absorbed upon said surfaces, causes adhesive films to be formed so that particles will adhere together. The vapor is introduced into the gas to provide a gas-to-vapor ratio which, within the range of temperatures employed, will result in surface condensation and/or absorption of the vapor upon the particles in the upper zone or strata of the bed of moving particles.

In this specification and appended claims the "vapor-gas" consists either of condensable vapors alone in superheated condition or of said superheated and condensable vapors admixed with the substantially non-condensable carrier gas.

Where herein and in the appended claims the term "fluidization" is used, the broad significance of that term is intended to include not only the state or condition which is known in the process industries as "fluidization" as pulverulent solids, but also a condition where the solid particles are partially suspended in the gaseous mixture by mechanical agitation or other means to an extent necessary to cause them to flow in much the same manner as a liquid.

The basic principle of our novel process is described and illustrated in more detail by reference to FIG. 4 of the drawings. It will be noted that the uniformly introduced, pulverulent material is fluidized into the form of a bed which is caused to travel through a predetermined, generally horizontal path in the apparatus illustrated.

It will of course be understood that variations in said general path such as declinations or breaks in the continuity thereof from screen to screen may be employed without departing from the scope of our invention.

The superheated vapor-gas supplied from the lower chamber 31 flows upwardly through the permeable supporting medium or screen 18 and through a particular area of the moving bed thereabove, and is initially maintained at a temperature considerably above the dew point of the vapor-gas utilized as will later be indicated from the ranges of temperature expressed in the examples accompanying this specification. In said upward flow of vapor-gas, the superheat is dissipated by the underlying or inner layer of the bed of fluidized powder and heats the same until, after dissipation of the superheat, condensation occurs in the upper portion of the moving bed and preferably in a statum of a thickness of several times the thickness of the dry underlayer, as indicated in the diagrammatic illustration, FIG. 4. The condensate on the surfaces of the particles causes said surfaces to become softened and adherent so that agglomeration proceeds in the said upper zone with the rapid agitation and dispersion of particles effected through continued fluidization of the moving bed of material. Such fluidization is preferably brought about through the upward flow of gas or gaseous medium in the treating chambers and, in certain applications of our process, in the preliminary fluidization chamber 29.

It is essential that the temperature of superheat of the vapor is sufficiently above the dew point of the vapor-gas to prevent condensation and/or absorption of the agglomerating vapor close to the porous medium or screen.

The dispersion and agitation of the solid particles (powdered and initial agglomerates) and the efficiency of agglomeration carried out in the first treatment chamber 33a and in the second or drying treatment chamber 38 are substantially enhanced by the rapid, short-stroke vibration of the apparatus preferably including not only vibration of the permeable supporting medium or screens but also of the chamber-defining walls of the apparatus, in directions generally transverse to the upwardly flowing vapor-gas. If in chamber 33a certain of the discrete powder-particles or adhered pluralities of particles in the upper stratum carrying adhesive surface films shift downwardly in the resulting dispersion, the same encounter dry heated particles disposed therebelow and pick up numbers thereof in their subsequent general horizontal travel.

By reference again to FIG. 4 it will be seen that the fluidized bed moves generally horizontally from the first treatment chamber 33a into the drying treatment chamber 38 where a drying gas usually but not necessarily maintained above room temperature is circulated or flowed upwardly through the solid material which is then for the most part in the form of agglomerates. The inclined line L–1 indicates approximately the cut or plane of the moving bed in the drying chamber 38 above screen 19 beyond which almost all of the agglomerates are rigidified and the adhesive substances hardened.

In many applications of our process it is desirable to cool the dry agglomerated material which discharges with the moving bed from the drying chamber 38 and thus, in the apparatus of FIGS. 1 to 3, a cooling chamber 43 is employed above a permeable supporting medium or screen 20 through which dry, inert gas such as air is flowed upwardly at the desired cooling temperature.

The use of the coarser classifying screen 21 and the discharge spouts 46 and 48 is optional but is desirable for production of agglomerates of specified size with many types of pulverulent material.

EXAMPLES

To illustrate the manner in which various materials can be agglomerated with machines or apparatus of the type we have invented and herein described, to demonstrate the utility of and means for controlling the process variables, and to point out the benefits attained when powdered materials are treated in accordance with our process, there follows a series of examples of agglomerating tests made with a pilot plant apparatus constructed and operated as heretofore described, the essential dimensions and features of apparatus common to all examples being:

Width of agglomerating section___ 5¼".
Length of agglomerating section___ 19½".
Vibration_____ 30° from horizontal in direction of product travel.

*Example #1.—Angel food cake "A" mix*

In this example, the material agglomerated was a finely powdered mixture, an angel food cake "A" mix, consisting of:

| | Percent |
|---|---|
| Dried egg albumen | 31.258 |
| Confectioners' sugar (XXXXXX) | 67.308 |
| Anhydrous monocalcium phosphate | 1.434 |
| | 100.000 |

Other conditions were as follows:

Feed rate of powdered material_____ 10 lb. per min.
Carrier gas, air_____ 9.2 lb. per min.
Stroke, ¼" vibration of frame, cycles per minute.
Agglomerating vapor, steam_____ 3.5 lb. per min.
Temperatures of vapor-gas fed:
    (a)_____ 189° F.
    (b)_____ 202° F.
    (c)_____ 212° F.
    (d)_____ 223° F.
    (e)_____ 228° F.
    (f)_____ 240° F.
    Dew point of gas mixture fed_____ 166° F.

In this test heavy fouling of the screen, or pervious medium, occurred at a gas temperature of 189° F., and the extent of fouling decreased at the successively higher temperature until, at 223°, the fouling disappeared. At all higher temperatures the screen remained completely clean, and agglomeration proceeded in a highly efficient manner, as evidenced by the granular nature of the agglomerated product when compared to the dusty nature of the fine powder before agglomerating and by greatly improved water dispersibility of the agglomerated material.

The reason why the screen fouled at the lower gas temperatures, as demonstrated by these data, is that the temperature was not sufficiently above the dew point. The small amount of superheat in the agglomerating vapor was dissipated so rapidly upon contact with the cooler powder in the lower layer that the gas temperature dropped rapidly to the dew point. Condensation and absorption of the condensed liquid then occurred so that the particle surfaces became sticky in the lower layer, and the screen became fouled.

At the higher temperatures, the amount of superheat in the gas was sufficient to prevent condensation until the gas reached a higher layer. The lower layer material of course cooled the gas to some extent, but the dew point, or temperature at which appreciable condensation occurred, existed only in the upper layers. The lower layer remained dry and in a substantially fluidized state to provide the "underlying bed" of flowable material, on top of which the particles being moistened and rendered sticky could ride toward the discharge end.

As the material flowed toward the discharge end of the apparatus, the sticky upper and intermediate layers co-mingled increasingly with the dry lower layer so that substantially all of the particles had opportunities to collide in such a manner as to adhere together in the form of discrete agglomerates.

*Comment.*—Numerous tests have been made to demonstrate that the presence of the superheated agglomerating vapor is necessary to accomplish the agglomeration. When it is not present, as in the case when only hot air is used, the powdered material simply travels across the screen without forming agglomerates. When the agglomerating vapor is employed with insufficient superheat, fouling of the equipment occurs, as in the initial parts of the preceding example.

If a thermoplastic material is treated according to our process, the gas temperature must not be so high as to melt the material. This has been demonstrated repeatedly with pulverized hydrogenated lard flakes, glyceryl monostearate, and the like. A gas temperature high enough to soften the surface by heat alone causes an immediate break-down of the lower fluidized or flowable layer so that the equipment fouls and becomes inoperative. It is essential to avoid any conditions that cause stickiness in the lower layer, such as by incipient melting of the surfaces or premature condensation of the agglomerating vapors thereon. In general, therefore, the gas used can be at any temperature below the melting point or softening point of the material being treated and above the actual temperature of the pulverulent material at the time of treatment.

Many organic materials do not become sticky when moistened with certain liquids. Lard flakes, as an example, do not become adherent through the surface condensation of water vapor, but many organic solvents such as hydrocarbons do possess proper solvent action and can be used as the agglomerating vapor. The operating conditions must be so chosen, as heretofore described, to achieve surface condensation in the agglomerating zone so that surface softening, adhesion, and agglomeration can proceed.

*Example 2.—Chocolate-drink-product*

A powdered chocolate drink type product consisting of 20% cocoa powder and 80% finely ground sugar was agglomerated using 4.0 lbs. of steam per minute mixed with 8.5 lbs. per minute air. The gas-vapor mixture was heated to 225° F. prior to entering the agglomerating process area. A frequency of vibration of 1050 cycles per minute and a vibration amplitude of 9/16″ were used. The dry powder was supplied to the agglomerator at a rate of 8.5 lbs. per minute.

| Sieve Analysis | Agglomerated | Non-Agglomerated |
|---|---|---|
| U.S. Sieve No.: | | |
| over 14 | 11 | 0 |
| 14–36 | 41 | 0 |
| 36–60 | 24 | 0 |
| 60–100 | 16 | 0 |
| finer than 100 | 8 | 100 |
| Bulk Density (tapped to constant volume), g./cc. | 0.43 | 0.74 |

To test the ease of dispersion of the agglomerated and non-agglomerated powders in cold milk, a teaspoon of each was placed on the surface of cold non-agitated milk. The time required for the powder to become submerged below the surface was noted and was 2 seconds for the agglomerated chocolate drink powder and in excess of 5 minutes for the non-agglomerated powder. Upon stirring, the non-agglomerated product formed nearly insoluble pills which could not be readily dispersed. The agglomerated product, on the other hand, with only slight stirring, dispersed into a uniform suspension in which very little settling out or floating of the particles occurred during subsequent standing. As an instant type of beverage preparation this suspension possessed all the usually desirable characteristics, whereas the mixture of non-agglomerated product with milk neither looked nor tasted like a chocolate beverage because of the failure of the solids to disperse adequately.

*Example 3.—Flour-sugar mixtures*

Mixtures of flour and confectioners' (XXXXXX) sugar were agglomerated. The effect of sugar-flour ratio and agglomeration on the bulk density and dispersion time in water is shown in the table below. The amount of steam used was adjusted for each run so as to effect good agglomeration in each case. During the several instances or runs hereafter tabulated the temperature of the vapor-gas mixture passing upwardly through the screen of the agglomerating chamber, was approximately 230° F.

| Sugar, Percent | Flour, Percent | # Steam Per Air | Dew Point, ° F. | Bulk Density Not Aggl. | g./cc. Agglm. | Dispersion Not Agglm. | Time, Sec., Agglm. |
|---|---|---|---|---|---|---|---|
| 90 | 10 | 0.65 | 180 | 0.661 | 0.433 | 22 | 1 |
| 75 | 25 | 0.72 | 182 | 0.726 | 0.466 | 22 | 1 |
| 50 | 50 | 0.83 | 185 | 0.705 | 0.398 | 22 | 1 |
| 25 | 75 | 0.79 | 184 | 0.699 | 0.387 | 26 | 2 |
| 15 | 85 | 0.90 | 186 | 0.681 | 0.447 | 28 | 7 |
| 10 | 90 | ¹1.03 | 189 | 0.685 | 0.541 | 30 | 10 |
| 5 | 95 | ¹1.03 | 189 | 0.669 | 0.553 | 35 | 20 |

¹ Maximum obtainable in apparatus.

*Example 4.—Confectioners' sugar alone*

Confectioners' grade (XXXXXX) sugar was agglomerated using three different steam/air ratios and two different vibration frequencies. The effect on particle size distribution of the agglomerated products is shown below. During these runs the humid air temperature was held at 230° F. and the air flow 8.5 lbs./minute. A 3/8 inch amplitude of vibration was employed and the sugar was supplied at a rate of 12 lbs. per minute to the 5¼″ wide and 19½″ long agglomerating section.

| | Run I | Run II | Run III |
|---|---|---|---|
| Steam—lbs. per minute | 2.9 | 2.9 | 3.13 |
| Steam/air ratio | 0.34 | 0.34 | 0.37 |
| Frequency of vibration cycles per min. | 900 | 800 | 800 |
| Particle Size—U.S. Sieve No.: | | | |
| Larger than 12 percent | 21.6 | 14.6 | 27.6 |
| 12–16 do | 21.4 | 22.0 | 23.3 |
| 16–20 do | 23.5 | 16.2 | 15.4 |
| 20–40 do | 18.9 | 20.5 | 20.5 |
| 40–60 do | 8.0 | 9.1 | 5.3 |
| Finer than 60 do | 6.6 | 17.6 | 7.9 |

All of the sugar passed through a #60 sieve before agglomeration.

The agglomerated sugar from the three runs dispersed and dissolved instantly in water whereas the unagglomerated powder required over 60 seconds to become dispersed and dissolved.

The above example clearly shows two separate means whereby the particle size distribution of the agglomerates may be adjusted, namely by means of the steam rate and by means of the frequency of vibration. The finer overall particle size in run II as compared to run I was accomplished by using a lower frequency of vibration. By increasing the steam rate, as in run III, a size range is again obtained which approximates the results of run I quite closely, although the vibration rate was the same as in run II.

*Example 5*

Crystalline ammonium sulfate was ground on a Mikro-pulverizer using a screen with 0.039" round perforations. The agglomerator was operated at 1000 cycles per minute, ½" amplitude, 10 lbs. per minute feed rate. A mixture of 4 lbs. steam and 8.5 lbs. air per minute heated to 220° F. was supplied to the agglomerating section. The bulk density of the material was lowered substantially as follows:

|  | Grams/cc. |
|---|---|
| Ammonium sulfate, crystalline | 1.06 |
| Ammonium sulfate, ground | 0.89 |
| Ammonium sulfate, ground, agglomerated | 0.59 |

The agglomerated powder dispersed and dissolved instantly in cold water whereas the crystalline material dissolved slowly because of the large crystal size, and the ground material dispersed and dissolved very slowly because of poor wettability.

*Example 6*

A mixture containing 32% dried egg albumen and 68% confectioners' grade (XXXXXX) sugar was agglomerated using three different steam-to-air ratios, all other factors being held constant. The table below shows the reduction in bulk density and dispersion time in each case. In each instance the temperature of the vapor-gas mixture was supplied and maintained at 230° F.

| Steam/air Ratio | Bulk Density, grams/cc. | Dispersion Time and Seconds |
|---|---|---|
| 0.34 | 0.404 | 40 |
| 0.40 | 0.359 | 25 |
| 0.47 | 0.318 | 20 |
| Non-agglomerated | 0.664 | [1] over 60 |

[1] Dispersion times in excess of 60 seconds not measured.

After five months' storage in a cardboard package with glassine liner under 100° F. and 50% relative humidity, the non-agglomerated product was badly caked. All agglomerated products remained free flowing under the same conditions.

*Example 7*

Sodium hexameta phosphate was ground through a screen with 0.020" round perforations. The powdered material was agglomerated using 1.75 lbs./minute steam mixed with 8.5 lbs./minute air. This mixture was heated to 225° F. The feed rate of the hexameta phosphate was 10.5 lbs. per minute. The agglomerator operated at a frequency of 1050 cycles per minute and ¼" amplitude of vibration.

Sieve analysis:

|  | Agglomerated | Non-Agglomerated |
|---|---|---|
| U.S. Sieve No.: |  |  |
| Over 14 percent | 30 | 0 |
| 14–36 do | 29 | 0 |
| 36–60 do | 10 | 0 |
| 60–100 do | 17 | 0 |
| finer than 100 do | 14 | 100 |
| Bulk density (tapped to constant volume) g./cc. | 0.60 | 1.06 |

A simple dispersion test was conducted on both the agglomerated and non-agglomerated powder as follows:

One teaspoon of the powder was dropped into one glass of cold water. The time for complete dissolution of the powder was noted. No agitation was used.

In the case of the non-agglomerated powder, the material sank to the bottom of the glass where it stayed substantially undissolved for a period in excess of 5 minutes at which time the test was discontinued. The agglomerated product appeared completely dissolved after a period not exceeding 5 seconds. Initial cloudiness created by the agglomerated powder in the water prevented a more exact time determination, but at the end of said interval of 5 seconds the water was crystal clear, all of the powder having gone rapidly into solution.

What is claimed is:

1. The process of efficiently agglomerating pulverulent material which consists in producing and moving a bed of such materials in substantially fluidized state on a permeable supporting medium through a predetermined course of travel, flowing a superheated vapor-gas transversely of the travel of said bed through a predetermined area thereof at a temperature originally above the dew point of the vapor-gas utilized, permitting said superheated vapor gas to heat the inner zone of pulverulent material, cool to its dew point and condense upon the surfaces of the moving particles in the outer zone thereby producing adhesive agglomerating films thereon, and flowing a drying fluid medium transversely through the moving bed of said material in a subsequent area of travel adjacent said first mentioned area to dry said adhesive films and rigidify the agglomerates formed.

2. The process set forth in claim 1 further characterized by the step of rapidly and continuously vibrating the bed of materials in its travel, along directions generally transverse to the flows of said vapor-gas and drying fluid.

3. Essential steps in the process of agglomerating pulverulent materials which consist in producing, substantially fluidizing, and moving a bed of such material over a permeable supporting medium, and during said movement of material flowing a superheated vapor-gas upwardly through at least a portion of said medium at a temperature originally above the dew point of said vapor-gas, permitting said superheated vapor gas to heat the lower zone of pulverulent material immediately above said supporting medium to cool to its dew point and condense upon the surfaces of the moving particles in the upper zone and to thereby produce adhesive agglomerating films thereon, and maintaining said bed in a state of turbulence during said movement without substantially deforming the cross sectional area of said bed.

4. The process of agglomerating pulverulent materials which consists in producing and moving a bed of such materials over a permeable supporting medium through a determined course of travel and, during said movement of material flowing a superheated vapor-gas upwardly through at least a transverse portion of said medium at a temperature originally above the dew point of said vapor-gas, permitting said superheated vapor gas to heat the lower zone of pulverulent material immediately adjacent said supporting medium and to cool to its dew point and condense upon the surfaces of the moving particles in the upper zone, thereby producing adhesive agglomerating films thereon and flowing a drying fluid medium upwardly through at least a portion of said permeable medium and through the fluidized material after said condensation of vapor on the individual surfaces thereof to further aerate and cause collision of said particles and agglomeration and to dry and rigidify the agglomerates formed.

5. The process as set forth in preceding claim 4 further characterized by the step of rapidly vibrating said permeable supporting medium and the bed thereon to further disperse and collide discrete solid particles of the material and directionally to also produce travel of said bed through a predetermined course.

6. The process of efficiently agglomerating pulverulent materials which consists in producing and moving and defining a bed of such materials in substantially fluidized state on a permeable supporting medium through a predetermined course of travel, flowing a superheated vapor-gas transversely of the travel of said bed through a predetermined area thereof at a temperature originally above the dew point of the vapor-gas utilized, permitting said vapor-gas to cool to its dew point and condense upon the surfaces of the moving particles comprising said bed and thereafter flowing a drying medium through the moving bed in an area of travel adjacent and beyond said first mentioned area.

7. The process of efficiently agglomerating pulverulent materials in small space requirements which consists in providing supporting media comprising at least two adjacent sections, the first of said sections being highly permeable, producing and moving a bed of pulverulent material in at least partially fluidized state successively over said supporting sections, flowing a superheated vapor-gas mixture upwardly through said first permeable supporting section permitting said superheated vapor gas to partially suspend and create a condition of turbulence of the particles in said moving bed above said first supporting section and to heat the lowermost zone of pulverulent material, cool to its dew point and condense upon the surfaces of the moving particles in the upper zone to thereby produce adhesive agglomerating films on such surfaces, and applying a drying medium through the bed of moving material above said second supporting section to dry said adhesive film and rigidify the agglomerates formed.

8. The process of efficiently agglomerating pulverulent materials in small space requirements, which consists in providing a generally horizontal supporting medium defining at least two adjacent permeable sections, producing and moving a defined bed of such materials in at least partially fluidized state successively over said supporting sections, flowing a superheated vapor-gas mixture upwardly through said first permeable supporting section, permitting said superheated vapor gas to heat the lower zone of said pulverulent material above said first supporting section, to cool to its dew point and condense upon the surfaces of the moving particles in the upper zone, thereby producing adhesive, agglomerating surfaces on such particles and also permitting said vapor gas to maintain said particles above said first section in a state of turbulence without substantially deforming the general cross sectional area of said bed, flowing a drying fluid medium upwardly through the bed of moving material above said second permeable section to continue maintenance of the particles above said section in a state of turbulence, and during said previously recited steps, rapidly vibrating said supporting sections and the bed of moving materials above the same, the direction of movement of said vibration extending generally transversely of the upward flow of vapor-gas through said first permeable section.

9. In apparatus for efficiently agglomerating pulverulent material within small space requirements, structure for providing a plurality of communicating and successive generally horizontal pervious supporting sections, means for mounting said sections for vibration generally longitudinal to the succession and arrangement of said sections, means for delivering pulverulent material in bed formation upon the first section of said series, means for flowing a superheated vapor-gas upwardly through the first of said pervious sections and the bed of material thereon, means for flowing a drying fluid medium upwardly through the second of said pervious supporting sections and means for vibrating said sections directionally to at least partially produce movement of said bed through a predetermined course of travel successively over said two identified pervious sections.

10. In a machine for efficiently agglomerating pulverulent materials in small space requirements, structure for defining a plurality of adjacent and successive generally horizontal treatment chambers, means for successively intercommunicating the said chambers, each of said chambers having its bottom portion defined by a pervious sheet, means for mounting said chambers for vibration in directions extending generally transversely of the heights thereof, means for delivering pulverulent material in bed formation upon the first pervious sheet of said succession of chambers, means for upwardly flowing a superheated vapor-gas substantially uniformly through the first of said pervious sheets and the bed of material thereon, means for controlling the velocity of said flow relative to the specific gravity of the pulverulent material to substantially fluidize and aerate the particles of said bed and to subject particles in the upper stratum zone of said bed to condensation from said vapor-gas, means for flowing a drying fluid medium upwardly through the pervious sheet of the second successive chamber, and means for agitating said chambers to intensify dispersion and collision of solid particles along paths traversing the upward flow of vapor-gas and drying fluid medium.

11. Apparatus for agglomerating powdered material comprising a continuous elongated supporting web of pervious structure, means for uniformly feeding powdered material in bed formation upon one end of said web, means for moving the bed of material substantially throughout the length of said web, means for flowing superheated vapor-gas upwardly through a portion of the area of said web adjacent the receiving end thereof to substantially fluidize and disperse the particles of said bed, means for flowing a drying fluid medium upwardly through a portion of the area of said web adjacent said first mentioned area, a housing above said web defining at least a pair of communicating treatment chambers disposed respectively above said two web areas and means for vibrating said web in directions generally transverse to the upward flow of vapor-gas and drying fluid medium.

12. Essential steps in the process of agglomerating particulate materials which consist in providing supporting media, producing, substantially fluidizing, and moving a well defined bed of such material over said supporting media maintaining particles of said moving bed in a state of turbulence during the travel of said beds while continuing to maintain the general width and thickness of said bed, and during the travel and movement of said bed flowing a superheated vapor-gas transversely of the frame of said bed through a predetermined area thereof at a temperature originally above the dew point of the vapor-gas utilized, permitting said gas to cool to its dew point and condense upon the surfaces of the moving particles, thereby producing adhesive agglomerating films on the particles comprising said bed.

13. In apparatus for efficiently agglomerating pulverulent material within small space requirements, housing structure providing a plurality of communicating and successive treatment chambers, said housing structure including longitudinal side walls for defining the width of a bed or stream of moving pulverulent material and having substantially horizontal successive and pervious material-supporting sections disposed between said side walls, means for delivering pulverulent material in bed formation upon the first pervious supporting section, means for flowing vapor-gas upwardly through said first supporting section and through the bed of material thereon at a velocity to maintain the material above said section in a state of turbulence without substantially deforming its cross sectional area, means for flowing a drying fluid medium upwardly through said second pervious supporting section and the pulverulent material thereabove, means successively outwardly from said second section for collecting the material which passes thereover, and mechanism for imparting a directional traveling movement to said bed of material successively over said first and second sections and into said collecting means.

14. A process of agglomerating pulverulent materials which consists in producing a bed of such material on a supporting medium, maintaining the particles in at least the upper stratum of said bed in an agitated and dispersed state, treating said agitated particles in said upper stratum with a gaseous medium which condenses on said particles and forms adhesive surfaces thereon, thereby causing agglomeration thereof, and simultaneously maintaining the particles in the lower stratum of said bed next adjacent the supporting medium in a substantially non-adhesive condition during the agglomeration of said upper stratum.

15. The process of claim 14, wherein said bed is maintained in a substantially fluidized state during the described agglomerating operation.

16. The process of claim 14, wherein said bed is moved substantially continuously along a predetermined course of travel on said supporting medium.

17. A process of agglomerating pulverulent materials which consists in producing a bed of such material on a permeable supporting medium, maintaining the particles in the upper stratum of said bed in an agitated and dispersed state, and passing a gaseous medium through said bed and supporting medium, said gaseous medium condensing on the particles of said upper stratum thereby forming adhesive surfaces thereon and effecting agglomeration of the particles in said upper stratum and controlling the adhesive forming action of said gaseous medium and thereby preventing the formation of any significant amount of adhesive particles in the lower stratum of said bed adjacent said supporting medium.

18. A process of agglomerating pulverulent materials which consists in producing a bed of such material on a supporting medium, maintaining the particles in at least the upper stratum of said bed in an agitated and dispersed state, treating the particles comprising said upper stratum with a gaseous medium which condenses on said particles thereby forming hardenable adhesive surfaces on said particles and thereby causing agglomeration thereof, maintaining the particles in the lower stratum of said bed next adjacent the supporting medium in a substantially non-adhesive condition during the agglomeration of said upper stratum, and thereafter treating said agglomerates to harden said adhesive surfaces.

19. A process of agglomerating pulverulent material which consists in producing a substantially fluidized bed of such material, and treating the particles comprising said fluidized bed with a gaseous medium which condenses on said particles and forms adhesive surfaces thereon thereby effecting agglomeration of said adhesive particles.

20. A process of agglomerating pulverulent materials which consists in producing a substantially fluidized bed of such material on a permeable supporting medium, and passing a gaseous medium through said bed and said permeable supporting medium, said gaseous medium being absorbed by the particles comprising said fluidized bed and forming adhesive surfaces thereon to thereby effect agglomeration of said particles.

21. A process of agglomerating pulverulent material which consists in producing a substantially fluidized bed of such material on a permeable supporting medium, and passing a vapor gas through said bed and said permeable supporting medium and thereby causing condensation of said vapor gas on the surfaces of the particles to produce adhesive agglomerating films thereon and thereby effect agglomeration of said particles.

22. A process of agglomerating pulverulent material which consists in producing a substantially fluidized bed of such material on a supporting medium, and treating the particles comprising said bed with a gaseous medium which condenses on said particles to form adhesive agglomerating surfaces on said particles and thereby effect agglomeration of the adhesive particles in the bed when they make contact with one another.

23. A process of agglomerating pulverulent material which consists in providing supporting media, producing, substantially fluidizing and moving a bed of such material over said supporting media, and during the travel and movement of said bed treating the particles comprising said bed with a gaseous medium which is absorbed by the particles and forms adhesive surfaces thereon and thereby causing agglomeration thereof.

24. A process of agglomerating pulverulent materials which consists in producing a bed of such material on a supporting medium, maintaining the particles in at least the upper stratum of said bed in an agitated and dispersed state, treating said agitated particles in said upper stratum with a gaseous medium which is absorbed by said particles and forms adhesive surfaces thereon thereby causing agglomeration thereof, and simultaneously maintaining the particles in the lower stratum of said bed next adjacent the supporting medium in a substantially non-adhesive condition during the agglomeration of said upper stratum.

25. The process of claim 24, wherein said bed is maintained in a substantially fluidized state during the described agglomerating operation.

26. A process of agglomerating pulverulent materials which consists in producing a bed of such material on a permeable supporting medium, maintaining the particles in the upper stratum of said bed in an agitated and dispersed state, and passing a gaseous medium through said bed and supporting medium, said gaseous medium being absorbed by the particles of said upper stratum and forming adhesive surfaces thereon and thereby effecting agglomeration of the particles in said upper stratum, and controlling the adhesive forming action of said gaseous medium and thereby preventing the formation of any significant amount of adhesive particles in the lower stratum of said bed adjacent said supporting medium.

27. A process of agglomerating pulverulent material which consists in producing a substantially fluidized bed of such material, and treating the particles comprising said fluidized bed with a gaseous medium which is absorbed by said particle and forms adhesive surfaces thereon thereby effecting agglomeration of said adhesive particles.

References Cited in the file of this patent

UNITED STATES PATENTS

| | | |
|---|---|---|
| 2,551,088 | Whaley | June 13, 1950 |
| 2,772,958 | Beggs | Dec. 4, 1956 |
| 2,835,586 | Peebles | May 20, 1958 |